UNITED STATES PATENT OFFICE.

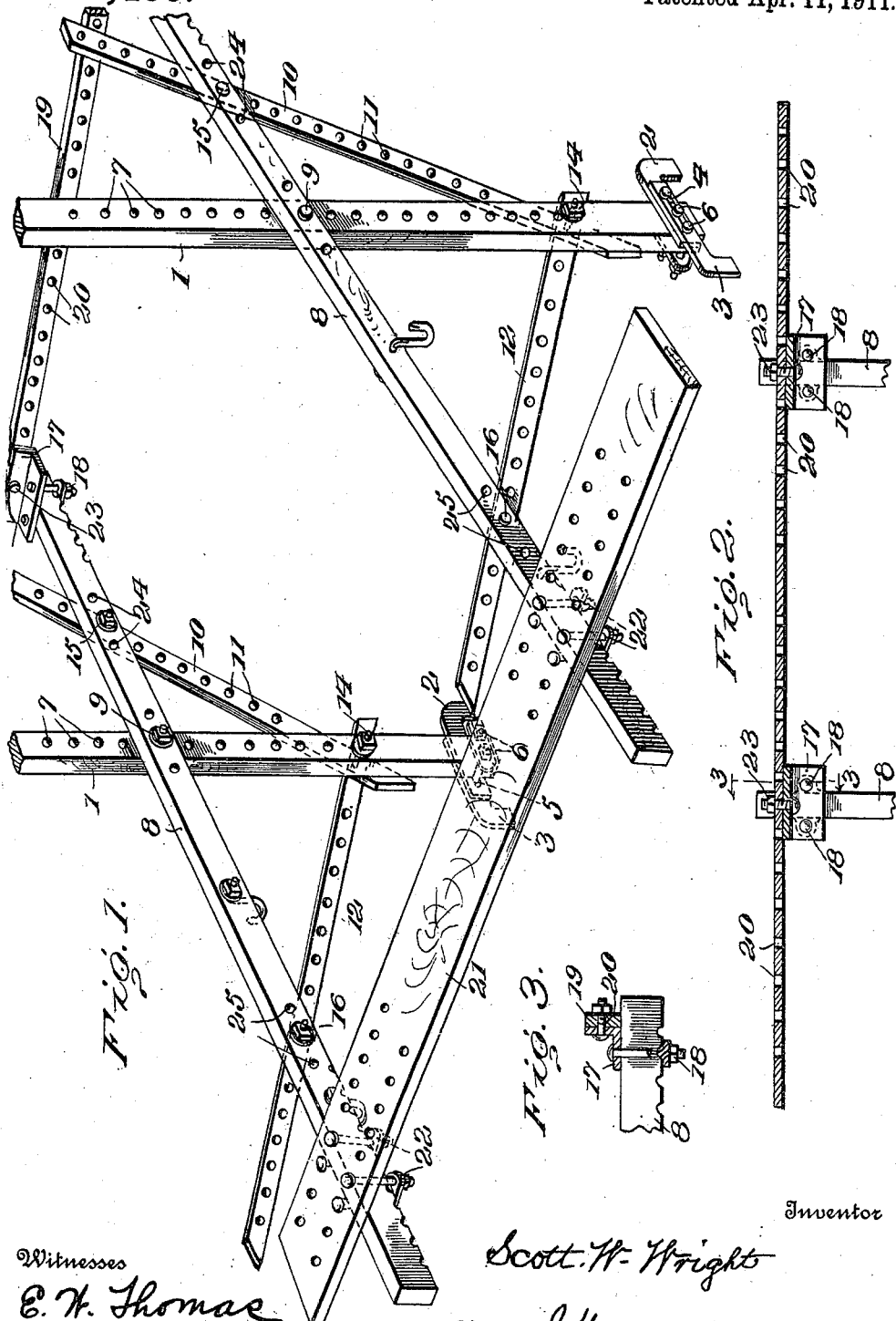

SCOTT W. WRIGHT, OF HAMLIN, TEXAS, ASSIGNOR OF ONE-HALF TO JAMES W. DAVIS, OF HAMLIN, TEXAS.

ADJUSTABLE WINDOW-SCAFFOLD.

989,466.  Specification of Letters Patent. Patented Apr. 11, 1911.

Application filed November 3, 1910. Serial No. 590,581.

*To all whom it may concern:*

Be it known that I, SCOTT W. WRIGHT, a citizen of the United States, residing at Hamlin, in the county of Jones and State of Texas, have invented certain new and useful Improvements in Adjustable Window-Scaffolds; and I do hereby declare the following to be a full, clear, and exact description of the invention, such as will enable others skilled in the art to which it appertains to make and use the same.

This invention relates to improvements in adjustable window scaffolds. It is so constructed that, while collapsible to the fullest extent, it retains the rigidity so necessary to this sort of structure. The structure also admits of quick adjustment to fit many different requirements. Because of the great range of adjustments it may be put to many different uses, and when taken apart forms a compact bundle, will easily fit in the ordinary carpenter's kit, and is thus easily carried from one job to another.

With the above and other objects in view this invention resides in the novel features of construction, formations, combinations and arrangement of parts to be hereinafter more fully described, claimed and illustrated in the accompanying drawings, in which—

Figure 1 is a perspective view of the device as assembled; Fig. 2 is a sectional view through the bar 19 of Fig. 1, and Fig. 3 is a sectional view through the plane 3—3 of Fig. 2.

Referring to the drawings by characters of reference, the numeral 1 represents the two upright members, supported by the sill clamps, each formed of two L-shaped members 2 and 3, having slots 4 and 5 cut in the longer legs, the two pieces being fastened to the bottom of the upright 1 by means of three bolts 6. The slots are formed in the sill hooks, so as to make it possible to quickly adjust these hooks to different widths of sills. The uprights 1 have a series of holes 7 drilled along their center lines. To any one of the upper holes 7 are bolted the cross members 8 by means of the bolts 9. Two rearward braces 10 are bolted at their lower ends to the bottom of the uprights 1 by means of bolts 14. The braces are provided with a series of holes 11, any one of which may register with any one of the holes 24 in the cross pieces 8 and to which braces are fastened by the bolts 15. Forward extending braces 12 are fastened at their lower ends to the uprights 1 by means of bolts 14, the braces being provided with holes, any one of which may register with any one of the holes 25 in the cross member 8, to which the braces are fastened by the bolts 16. Brackets 17 are fastened by the bolts 18 to the rearward end of the cross members 8. Transverse piece 19, provided with holes 20, can be adjusted to any distance between the cross members 8, and held by bolts 23 to the rear ends of the said cross members. On the front ends of the cross members 8 a seat 21 is placed and fastened to said cross members by means of the clamp bolts 22.

Having thus fully described this invention, what I claim as new and desire to secure by Letters Patent is:

A window scaffold such as described, consisting of upright members mounted upon adjustable sill clamps, a cross member vertically adjustably mounted on each upright member, forward and rearward extending braces pivoted at their lower ends to the lower part of the upright members, their upper portions provided with a series of holes, by means of which they are adjustably attached to the forward and rearward extremities of the above-mentioned cross members, a seat mounted upon the forward ends of the cross members, means for adjusting said seat to different positions on the cross members and for different distances between said cross members, a transverse piece adjustably mounted on the rearward ends of said cross members, and right-angle-shaped brackets slidably mounted on the rearward ends of the cross members and adjustably attached to the said transverse piece, substantially as and for the purposes set forth.

In testimony whereof I affix my signature in presence of two witnesses.

SCOTT W. WRIGHT.

Witnesses:
J. W. DAVIS,
E. R. WHITE.

---

Copies of this patent may be obtained for five cents each, by addressing the "Commissioner of Patents, Washington, D. C."